(12) United States Patent
Roy et al.

(10) Patent No.: US 8,688,270 B2
(45) Date of Patent: Apr. 1, 2014

(54) DEVICE FOR INFLUENCING NAVIGATION OF AN AUTONOMOUS VEHICLE

(71) Applicant: iRobot Corporation, Bedford, MA (US)

(72) Inventors: Robert Paul Roy, Dracut, MA (US); Rogelio Manfred Neumann, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/647,575

(22) Filed: Oct. 9, 2012

(65) Prior Publication Data

US 2013/0035793 A1 Feb. 7, 2013

Related U.S. Application Data

(63) Continuation of application No. 12/464,844, filed on May 12, 2009, now abandoned.

(51) Int. Cl.
G06F 19/00 (2011.01)
G05B 19/04 (2006.01)

(52) U.S. Cl.
USPC ........... 700/245; 700/247; 700/250; 700/253; 700/258; 700/259

(58) Field of Classification Search
None
See application file for complete search history.

(56) References Cited

U.S. PATENT DOCUMENTS

| | | | | |
|---|---|---|---|---|
| 4,119,900 A * | 10/1978 | Kremnitz | | 701/23 |
| 4,309,758 A * | 1/1982 | Halsall et al. | | 701/23 |
| 4,679,152 A * | 7/1987 | Perdue | | 701/23 |
| 4,796,198 A * | 1/1989 | Boultinghouse et al. | | 701/23 |
| 5,049,802 A * | 9/1991 | Mintus et al. | | 320/107 |
| 5,560,077 A * | 10/1996 | Crotchett | | 15/339 |
| 5,926,909 A * | 7/1999 | McGee | | 15/339 |
| 5,995,884 A * | 11/1999 | Allen et al. | | 701/24 |
| 6,076,226 A * | 6/2000 | Reed | | 15/319 |
| 6,278,917 B1* | 8/2001 | Bauer et al. | | 701/23 |
| 6,389,329 B1* | 5/2002 | Colens | | 700/262 |
| 6,525,509 B1* | 2/2003 | Petersson et al. | | 320/107 |
| 6,748,297 B2* | 6/2004 | Song et al. | | 700/259 |
| D510,066 S * | 9/2005 | Hickey et al. | | D13/108 |
| 6,957,712 B2* | 10/2005 | Song et al. | | 180/167 |
| 7,133,746 B2* | 11/2006 | Abramson et al. | | 700/259 |
| 7,188,000 B2* | 3/2007 | Chiappetta et al. | | 700/245 |
| 7,227,327 B2* | 6/2007 | Im | | 318/568.12 |
| 7,332,890 B2* | 2/2008 | Cohen et al. | | 320/109 |
| 7,489,985 B2* | 2/2009 | Ko et al. | | 700/259 |
| 7,693,605 B2* | 4/2010 | Park | | 700/245 |
| 2002/0016649 A1* | 2/2002 | Jones | | 700/245 |
| 2002/0120364 A1* | 8/2002 | Colens | | 700/262 |
| 2005/0156562 A1* | 7/2005 | Cohen et al. | | 320/107 |
| 2005/0213082 A1* | 9/2005 | DiBernardo et al. | | 356/139.03 |
| 2007/0016328 A1* | 1/2007 | Ziegler et al. | | 700/245 |
| 2007/0114975 A1* | 5/2007 | Cohen et al. | | 320/149 |
| 2007/0244610 A1* | 10/2007 | Ozick et al. | | 701/23 |
| 2007/0267998 A1* | 11/2007 | Cohen et al. | | 320/109 |

OTHER PUBLICATIONS

Prassler at al., "A short History of Cleaning Robots," Autonomous Robots, vol. 9, pp. 211-226 (2000).

* cited by examiner

Primary Examiner — Bhavesh V Amin
(74) Attorney, Agent, or Firm — Honigman Miller Schwartz and Cohn LLP

(57) ABSTRACT

A device for controlling the reflection of incident beams to influence navigation of an autonomous device having a navigation sensor comprising a beam emitter and a beam detector for detecting reflected emitted beams. The device comprises at least one surface having a geometry configured to direct a reflection from the emitted beam in a predetermined direction so that a suitable amount of the reflected beam can be detected by the detector.

18 Claims, 7 Drawing Sheets

DEVICE FOR INFLUENCING NAVIGATION OF AN AUTONOMOUS VEHICLE

CROSS REFERENCE TO RELATED APPLICATIONS

This U.S. patent application is a continuation of, and claims priority under 35 U.S.C. §120 from, U.S. patent application Ser. No. 12/464,844, filed on May 12, 2009, which is hereby incorporated by reference in its entirety.

TECHNICAL FIELD

The present teachings relate to devices and methods for controlling the reflection of emitted beams to influence navigation of an autonomous device having a navigation sensor utilizing reflected emitted beams to influence navigation, for example by ensuring that a reflection is obtained from an encountered surface that is inclined with respect to a surface on which the autonomous device is traveling. In certain embodiments, the present teachings relate more specifically to providing a surface configured to facilitate refection of emissions at an angle that allows proper operation of a cliff sensor of an autonomous device such as a robotic cleaning device encountering a surface that is inclined with respect to a surface on which the autonomous device is traveling.

BACKGROUND

Many autonomous devices that move around an area in a random or planned coverage path include navigation sensors such as cliff sensors that prevent the device from driving over a ledge such as, for example, stairs. A known cliff sensor and its method of operating are disclosed in U.S. Pat. No. 6,594,844, the entire disclosure of which is incorporated herein by reference. A schematic diagram of an exemplary cliff sensor is illustrated in FIG. 1. Many known cliff sensors include an infrared light emitting diode (IR-LED) emitter E that emits a beam from a bottom surface of the device onto the surface over which the device travels, most commonly at a predetermined angle. In turn, the surface can reflect or scatter the light upward, and the light can be fanned out over many three-dimensional angles, but with a high concentration of energy in the beam angle that is equal in size, but opposite in sign, to the IR-LED's angle of emission. A companion detector D (also referred to herein as a receiver), such as a photo-transistor that can be oriented to receive reflections from the illuminated zone, is provided to detect a portion of the scattered energy and send information regarding detected energy (e.g., the existence of the detected energy) to the device's controller to let the controller know that a cliff is not imminent. If no reflection is detected by the receiver, the controller can conclude that there is no surface over which to reflect and thus over which to travel, and can then halt or back away from the threat of falling.

Certain cliff sensors in autonomous devices direct the IR-LED beam onto the surface at an angle of, for example, about 20° to 30° from the vertical, and the receiver can be aimed at the intended illuminated spot at a slightly different angle, with both angles being in a common plane. An exemplary embodiment of a cliff sensor on a robotic cleaning device detecting the presence of a floor under the device is illustrated in FIG. 2A. One skilled in the art will understand that emitted light will be scattered to a greater extent in more reflective surfaces, despite the simplified illustration of FIG. 2A.

Because the cliff sensor works on the notion that a "cliff" exists when no reflection of the IR-LED beam is received, there can be occasions when no cliff exists, but the environment, surface composition, or surface geometry interferes with reflection of the IR-LED beam back to the receiver, causing false detection of a cliff and inappropriate halting or reversing of the autonomous device. The environment can effect cliff sensor operation when it contains too much ambient light. Surface composition that can interfere with proper cliff sensing includes dark or black carpeting, which absorbs light and thereby can prevent sufficient reflection of light back to the cliff sensor. One example of a surface geometry that interferes with reflection of the IR-LED beam back to the receiver includes certain 30°-60° surfaces encountered by the cliff sensor, particularly when the surface is highly reflective and thus scatters emitted light such that light is not concentrated at the cliff sensor detector to a suitable degree. While such inclined surfaces may not always interfere with accurate cliff sensor detection, they have the potential to interfere therewith.

An exemplary embodiment of a cliff sensor on a robotic cleaning device failing to detect the presence of an inclined surface in front of the device is illustrated in FIG. 2B. As can be seen, the surface in FIG. 2B is inclined at an angle of about 45° with respect to the horizontal. As can be seen, because the beam angle is emitted at, for example 20°, the beams therein are reflected from the inclined surface such that they are not detected by the detector. Thus, the controller may inappropriately halt or reverse the device, believing that a cliff exists. Further, the shinier (more reflective) the inclined surface is, the more the emitted beam is scattered and the less likely it is that the detector will receive enough emitted beam to properly move forward over the surface. An example of a shiny, inclined surface that can be encountered by a floor cleaning robot is a threshold or transition plate, as commonly used to transition between different types of flooring. One skilled in the art will understand that emitted light will be scattered to a greater extent in more reflective surfaces, despite the simplified illustration of FIG. 2B.

Docking stations are known to be used for, e.g., guiding, receiving, and/or charging autonomous devices such as robotic cleaning devices. Docking stations typically provide charging contacts to which contacts on the autonomous device connect so that a power source (e.g., a battery) on the autonomous device can be recharged. Docking stations commonly rest on the floor and provide the charging contact on a raised surface, as shown on FIG. 3.

Docking station design, for example combining aesthetic considerations with functional requirements, may dictate that certain surfaces such as exterior walls supporting the raised surface be inclined at an angle of between 30° to 60° which, as stated above, can cause inappropriate halting and/or reversing of the autonomous device, particularly if such inclined surfaces are highly reflective.

SUMMARY

The present teachings provide a device for controlling the reflection of incident beams to influence navigation of an autonomous device having a navigation sensor comprising a beam emitter and a beam detector for detecting reflected emitted beams. The device comprises at least one surface having a geometry configured to direct a reflection from the emitted beam in a predetermined direction so that a suitable amount of the reflected beam can be detected by the detector.

The present teachings also provide a device for controlling the reflection of incident beams to influence navigation of an autonomous device having a navigation sensor comprising a beam emitter and a beam detector for detecting reflected emitted beams. The device comprises at least one surface extending generally in a first plane and having a geometry comprising sub-surfaces extending in different planes than the first plane and directing a reflection from the emitted beam toward the beam detector.

The present teachings further provide a docking station having at least one inclined, reflective surface configured to control the reflection of incident beams, the surface influencing navigation of a robotic cleaning device having a navigation sensor comprising a beam emitter and a beam detector for detecting reflected emitted beams. The at least one inclined, reflective surface has a geometry configured to direct a reflection from the emitted beam in a predetermined direction so that a suitable amount of the reflected beam can be detected by the detector.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate several embodiments of the present teachings and, together with the description, serve to explain the principles thereof.

DESCRIPTION OF DRAWINGS

Like reference symbols in the various drawings indicate like elements.

DETAILED DESCRIPTION

Reference will now be made in detail to various exemplary embodiments of the present teachings, one or more of which are illustrated in the accompanying drawings.

As autonomous devices such as robotic cleaning devices navigate an area such as a floor to be cleaned, their path can be substantially randomly generated and controlled by input from various sensors on the autonomous device such as, for example, cliff sensors. The cliff sensor's primary purpose is to prevent the autonomous device from driving off of a "cliff." The cliff sensor can also be utilized, however, to control navigation of the autonomous device when reflection or the direction of a reflection of a beam emitted from the cliff sensor is controlled to influence navigational behavior of the vehicle. This can be done, for example, by (1) preventing proper reflection of the emitted cliff sensor beam to the cliff sensor detector to keep the autonomous device from entering an area, or by (2) causing reflection of the emitted cliff sensor beam to the cliff sensor detector to prevent inappropriate stopping and reversing of the autonomous device.

Figure 3:
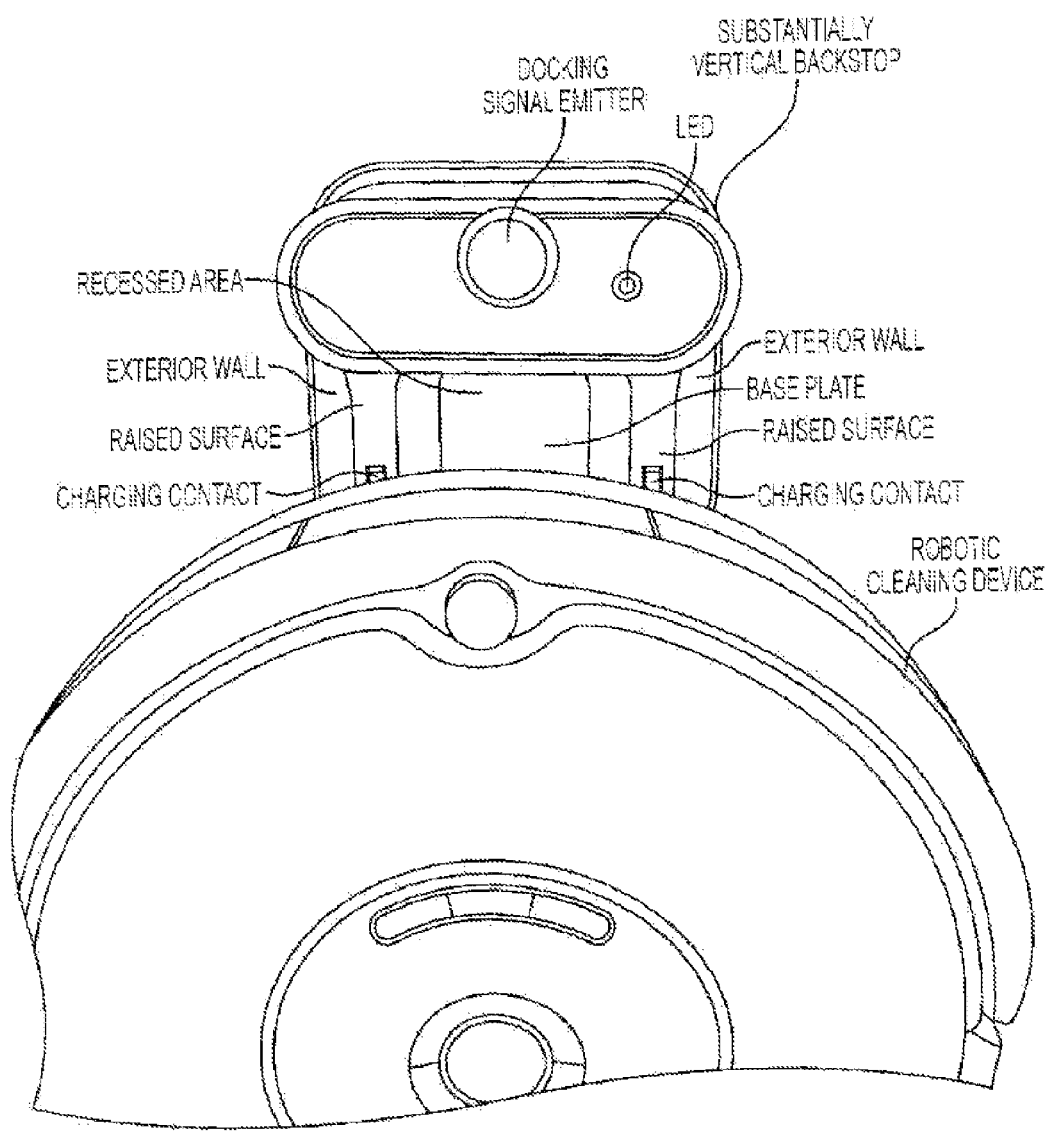
FIG. 3 illustrates an exemplary embodiment of a known autonomous device docking station.

As shown in FIG. 3, autonomous device docking stations can comprise a base plate and a substantially vertical backstop, and can include one or more docking signal emitters and one or more LEDs. The base plate can include one or more raised surfaces on which one or more charging contacts are provided and appropriately positioned to mate with contacts on the autonomous device. The raised surfaces can be supported by exterior walls that are inclined. In the illustrated exemplary docking station embodiment, two raised surfaces of the base plate extend forwardly from the substantially vertical backstop in a generally parallel arrangement, and a recessed area of the base plate extends between the two raised surfaces. The recessed area can accommodate structure on an underside of the autonomous device when it is docking or docked. In the embodiment illustrated in FIG. 3, the exterior walls of the base plate are inclined at an angle of between 30°-60°.

Many autonomous vehicles, such as robotic cleaning devices, are powered by a rechargeable power source such as a battery. When an autonomous device's battery needs to be recharged, the autonomous device typically begins the process of trying to locate and navigate to a docking station that can recharge its battery. The autonomous device may also return to the docking station when it is done performing its tasks. An exemplary process of locating and navigating to a docking station is described in U.S. patent application Ser. No. 11/633,869, filed Dec. 4, 2006, for an Autonomous Coverage Robot Navigation System, the entire content of which is incorporated herein by reference.

In an exemplary docking process, a base station emits an omnidirectional beam that is projected laterally around the docking station. In addition, navigational field emitters emit signal beams having laterally bounded and overlapping fields of emission. When the autonomous device enters a docking mode and detects, for example, the base station omni-directional beam and begins moving toward a base station, the remote vehicle can detect and follow a lateral field edge defined by one or more of the navigational field emitter signal beams, the lateral field edge being aligned with a proper docking direction. The autonomous device maneuvers toward the base station by detecting and advancing along the lateral field edge until it encounters the docking station. In certain embodiments, the autonomous device can servo along the lateral field edge.

In certain instances, when an autonomous device is attempting to dock with a docking station having an inclined reflective exterior wall such as that illustrated in FIG. 3, the cliff sensor of the autonomous device may not detect a beam reflected from the inclined surface for the reasons explained above. In such a case, the autonomous device may inappropriately conclude that a cliff exists. If the device then halts or reverses, it may not be able to properly dock and recharge its battery as needed.

The autonomous device may also pass close to docking station even when not trying to dock, and may be inappropriately halted by any reflective inclined wall thereof. Further, other inclined surfaces may exist in the environment in which the autonomous device navigates, and those surfaces may similarly interfere with autonomous device navigation.

Providing a surface having a geometry allowing the autonomous device to reliably detect surfaces having an incline of 30° to 60° from the horizontal can increase overall performance and reliability of the autonomous device. FIGS. 4-7 illustrate a docking station 100 having inclined walls and utilizing an exemplary geometry allowing a robotic cleaning device to reliably detect its presence and successfully dock. The illustrated exemplary docking station 100 includes a substantially vertical backstop 110 having a top surface 120. One skilled in the art will readily understand that the backstop can have a variety of shapes and sizes depending on a variety of aesthetic and functional limitations and considerations.

An emitter 130, such as an omni-directional emitter, can be located on the top surface 120 of the backstop 110, along with an LED 140. The emitter can facilitate docking of an autonomous cleaning device, for example in accordance with the description above. The LED can indicate, for example, when the docking station 100 has power. A front surface 150 of the backstop 110 can include one or more additional emitters 160, such as navigational field emitters, which can facilitate, for example, docking of an autonomous cleaning device, for example in accordance with the description above.

Figure 4:
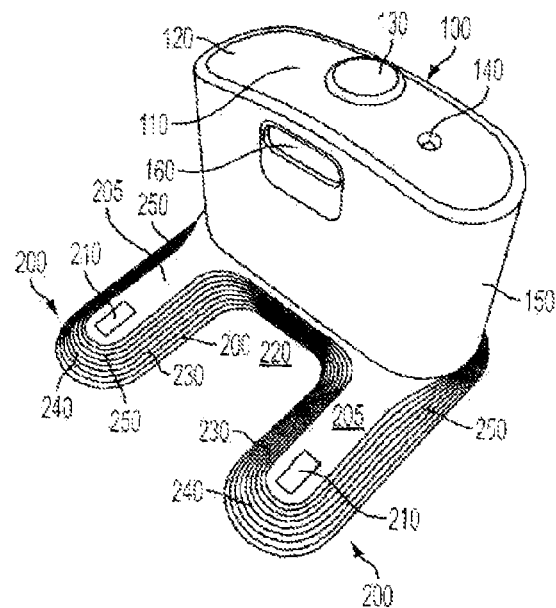
FIG. 4 illustrates an exemplary embodiment of a known autonomous device docking station having a surface geometry in accordance with the present teachings.

The exemplary docking station illustrated in FIG. 4 additionally includes, rather than a unitary base plate as illustrated in FIG. 3, two separate forwardly extending legs 200 with an opening 220 therebetween. Each forwardly-extending leg 200 can be sized and shaped to properly position a charging contact 210 for mating with charging contacts on an associated autonomous cleaning robot. In the embodiment illustrated in FIG. 4, the forwardly-extending legs 200 provide charging contacts 210 on respective raised top surfaces 205. Inclined walls, 230, 240, and 250 extend upwardly to the top surface 205 of the legs 200. An additional surface 260, extending downwardly from the backstop, may or may not be inclined. The inclined walls 230, 240, and 250 include interior side walls 230, front walls 240, and exterior side walls 250. In the illustrated embodiment, the inclined walls 230, 240, and 250 have a surface geometry allowing an autonomous cleaning robot to reliably detect, via its cliff sensor, the inclined walls 230, 240, and 250. The additional surface 260 may also have a geometry allowing an autonomous cleaning robot's cliff sensor to reliably detect it. In the illustrated embodiment, the geometry comprises a series of steps. Each step can comprise, for example, a vertical surface V and a horizontal surface H (see FIG. 5). The steps need not comprise portions that are exactly horizontal and exactly vertical. The angle of the surfaces comprising the steps can be adjusted to control the desired reflection path of light from the stepped surface.

Figure 1:
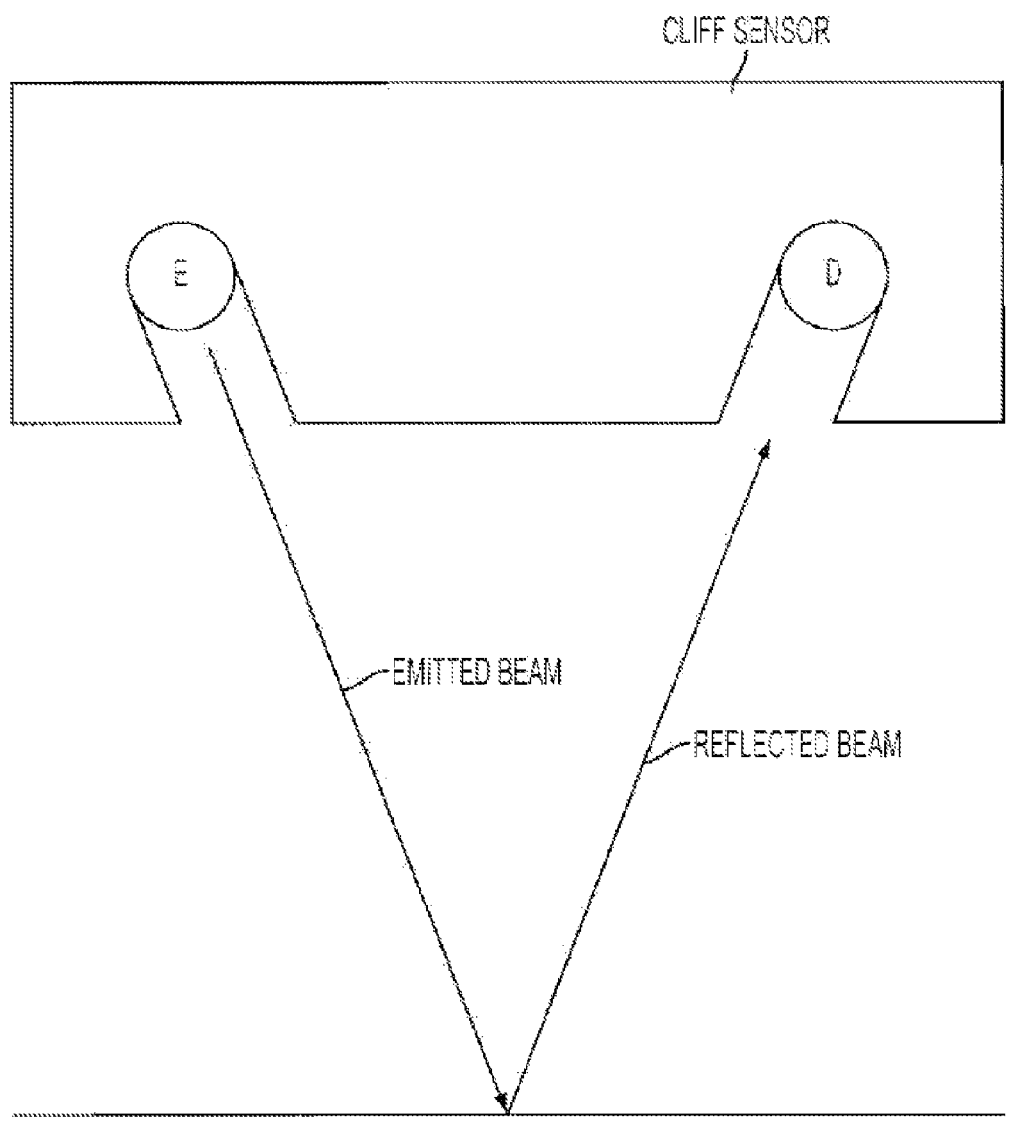
FIG. 1 is a schematic diagram of an exemplary known cliff sensor.
Figure 2A:
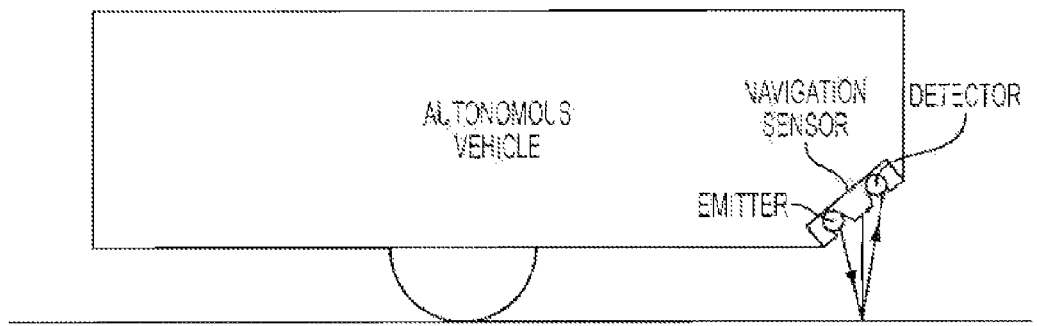
FIG. 2A illustrates an exemplary embodiment of a cliff sensor on a robotic cleaning device detecting the presence of a floor under the device.
Figure 2B:
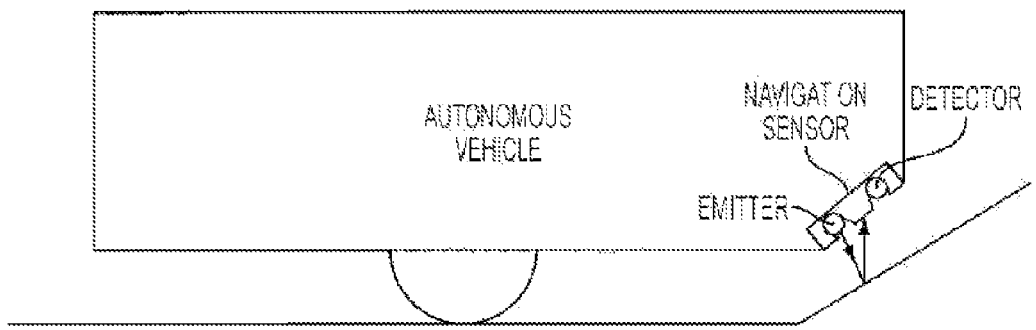
FIG. 2B illustrates an exemplary embodiment of a cliff sensor on a robotic cleaning device failing to detect the presence of an inclined surface in front of the device.
Figure 2C:
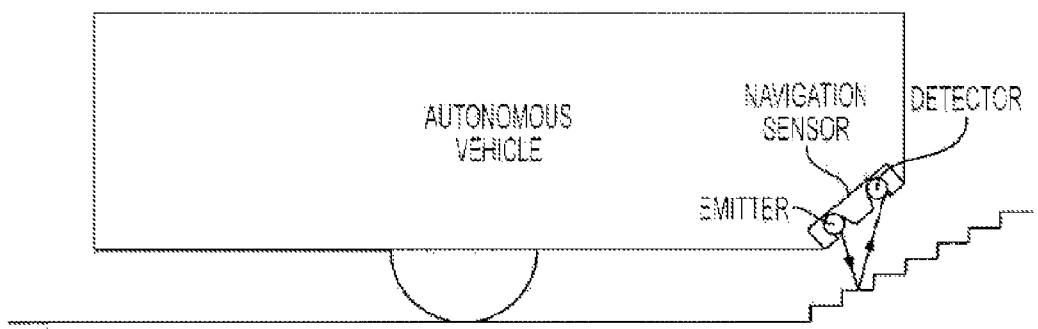
FIG. 2C illustrates an exemplary embodiment of a cliff sensor on a robotic cleaning device detecting the presence of an inclined surface in front of the device.

FIG. 2C is a schematic diagram of a cliff sensor on a robotic cleaning device detecting the presence of an encountered inclined surface having an exemplary surface geometry in accordance with the present teachings. As can be seen, the surface in FIG. 2C is generally at an angle of about 45° with respect to the horizontal, with the steps extending in substantially vertical and substantially horizontal planes. The emitted beams are reflected from the stepped surface toward the detector. Thus, the cliff detector should determine that no cliff exists and the robotic cleaning device can move forward. One skilled in the art will understand that emitted light will be scattered to a greater extent in more reflective surfaces, despite the simplified illustration of FIG. 2C.

Figure 6:
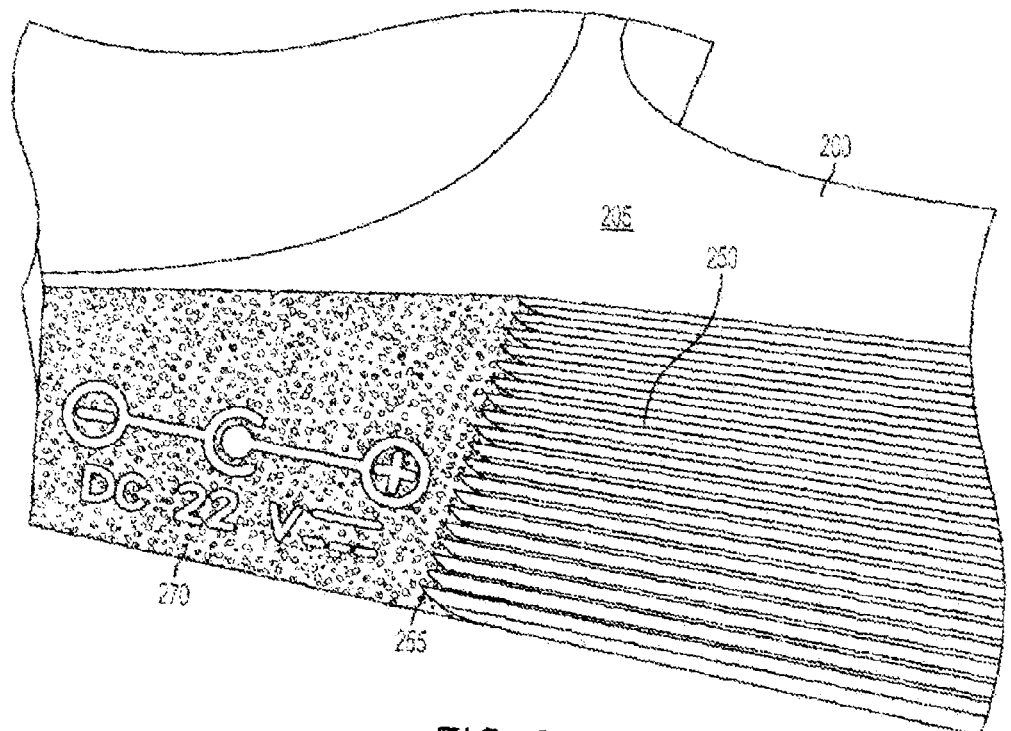
FIG. 6 illustrates an exemplary rear side area of the base station.

FIG. 6 illustrates an exemplary rear side area of the base station 100, where the leg 200 meets the back stop 100. As can be seen, in this exemplary rear side area, the stepped geometry of the exterior side wall 250 can end at a transition area 255 to a section having an alternative geometry 270. In this illustrated embodiment, the alternative embodiment includes a bumpy, textured surface. Such a surface can allow, as illustrated in FIG. 6, information to be displayed and visible on the surface while still improving detection of the surface by a cliff sensor.

Figure 7:
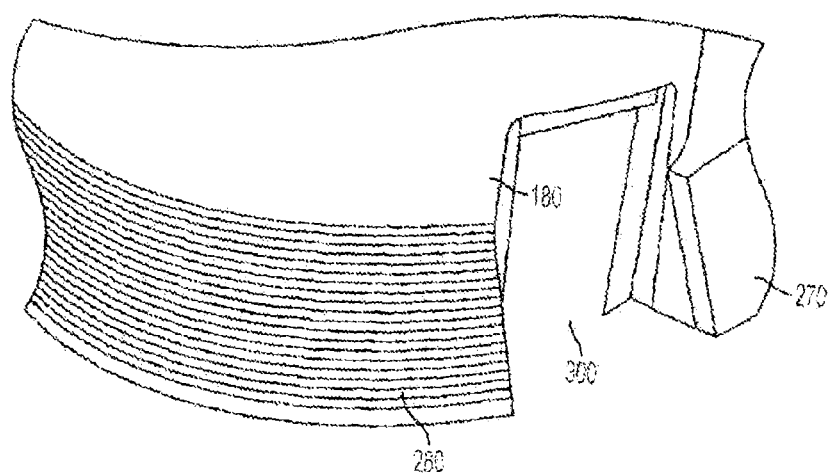
FIG. 7 illustrates an exemplary rear area of the base station.

FIG. 7 illustrates an exemplary rear portion of a side of the base station, including an aperture 300 extending through a wall 180 of the rear portion. The aperture can accommodate, for example, a power cord for the base station in a known manner. As can be seen, in the illustrated exemplary embodiment, lower portions 280, 290 of the rear wall can also be inclined, for example for aesthetic reasons. These inclined lower portions 280, 290 could conceivably come into contact with the cleaning robot's cliff sensor and can thus comprise a stepped or otherwise textured inclined surface in accordance with the present teachings to avoid false readings by the cleaning robot's cliff sensor.

Figure 5:
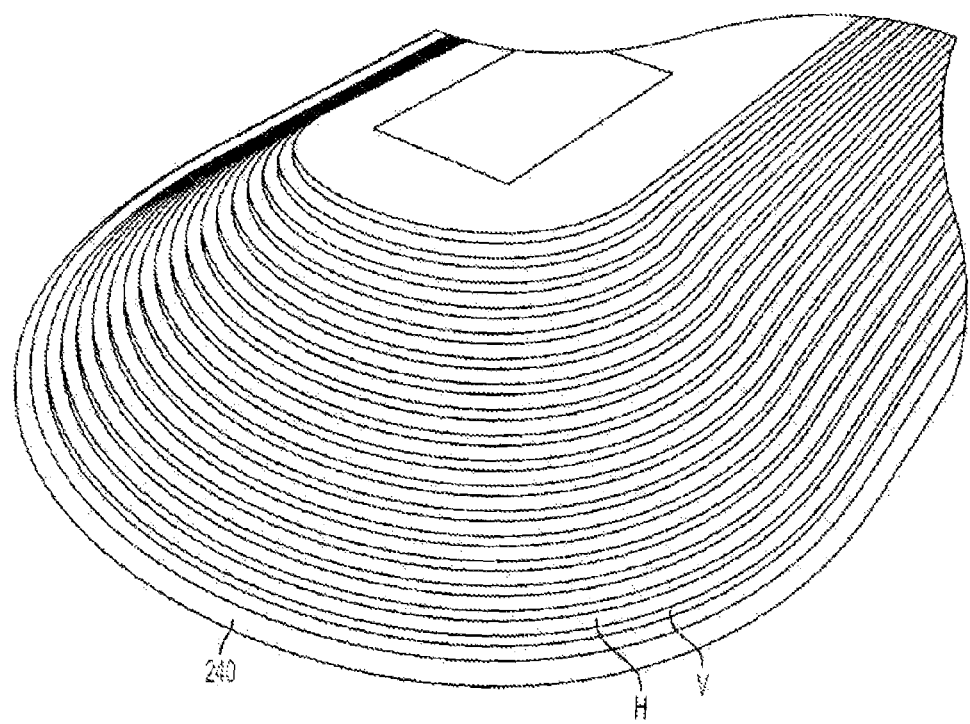
FIG. 5 is a detailed view of the surface geometry utilized in the docking station of FIG. 4.
Figure 8:
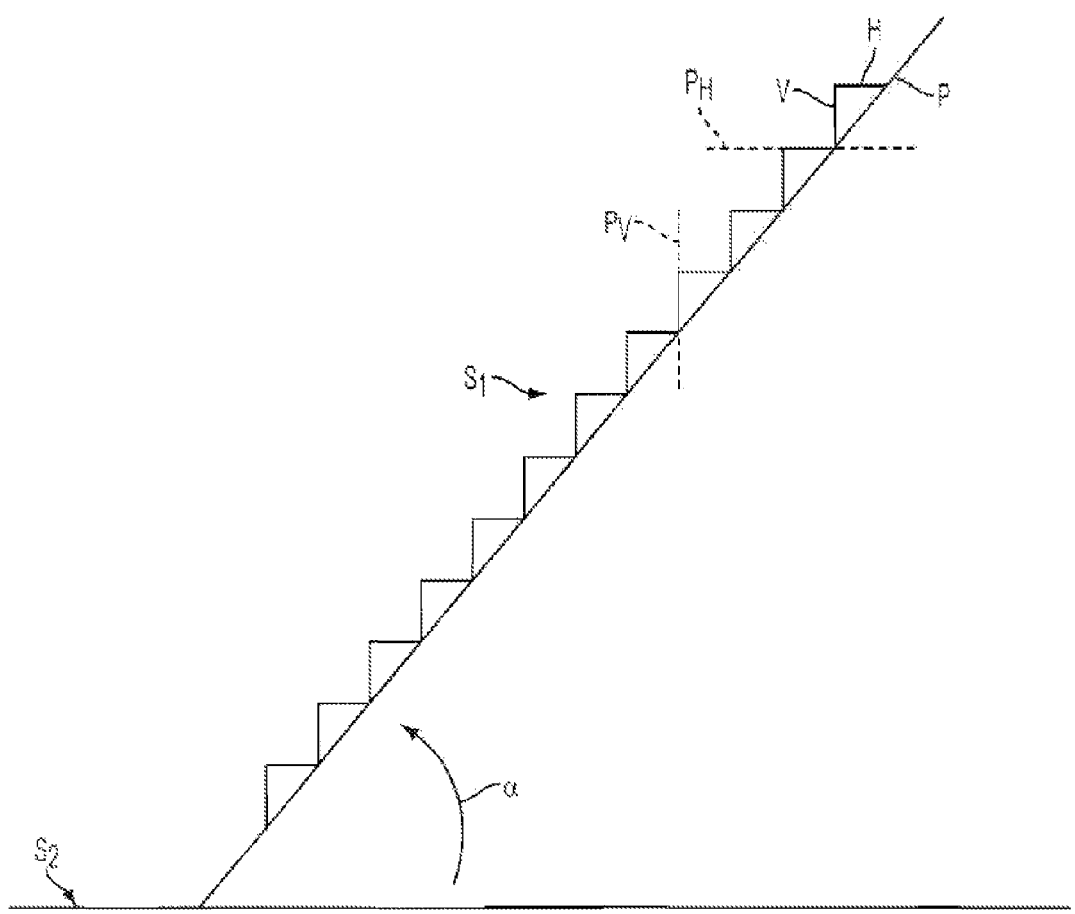
FIG. 8 is a schematic diagram of a cross section of an exemplary embodiment of a surface geometry in accordance with the present teachings.

FIG. 8 is a schematic diagram of a cross section of an exemplary embodiment of a surface geometry in accordance with the present teachings, such as the stepped surface illustrated in FIGS. 5-7. As shown, the surface S1 extends generally in a first plane P and has a geometry comprising sub-surfaces V and H extending in different planes, Pv and PH respectively, than the first plane P to direct a reflection from the emitted beam toward the beam detector. One skilled in the art will understand that the sub-surfaces need not be exactly vertical or horizontal, and the angles thereof can be modified to alter the control the location to which the beam reflections are directed. In the illustrated schematic, the plane P of surface 81 is inclined at an angle a with respect to a surface 82 over which an autonomous device would be traveling prior to encountering the surface 81.

The present teachings contemplate other embodiments having surface geometries that are not stepped, but which control reflection of emitted beams to redirect the emitted beam reflections. On such alterative embodiment comprises the textured surface geometry illustrated in section 270 of the illustrated base station. Such a surface geometry could be used over all of the discussed inclined surfaces of the docking station to improve cliff sensor detection of the docking station. In addition, the present teachings contemplate use of surface geometries for controlling reflection direction on elements other than a docking station. For example, such a surface geometry could be used on a threshold or transition plate, as commonly used to transition between different types of flooring, or on a ramped surface, for example transitioning between surfaces at different levels over which the autonomous device must navigate to get from one level to another.

Figure 9:
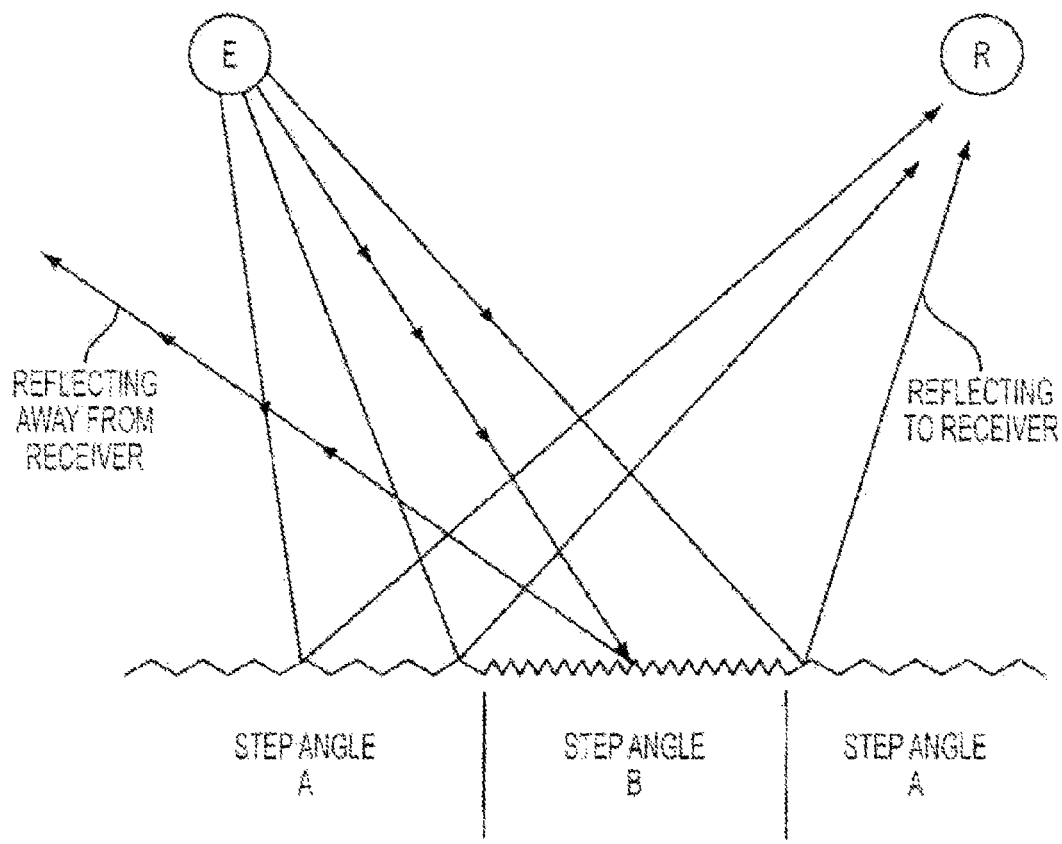
FIG. 9 is a schematic diagram illustrating an embodiment of a surface geometry that can be used to cause reflection of emitted beams away from a detector to prevent an autonomous device having a cliff or similar sensor from advancing to a given area.

Further, a surface geometry used in accordance with the present teachings can also be used to cause reflection of emitted beams away from a detector, for example to prevent an autonomous device having a cliff or similar sensor from advancing to a given area. For example, the present teachings contemplate using a surface geometry directing emitted beams away from a detector to prevent passage of an autonomous device into a bounded area such as a room. In one exemplary embodiment, a strip of material having such a surface geometry could be placed on the floor of a doorway to prevent the autonomous device from passing through the doorway. FIG. 9 is a schematic diagram illustrating an embodiment of a surface geometry that can be used to cause reflection of emitted beams away from a detector to prevent an autonomous device having a cliff or similar sensor from advancing to a given area. The area denoted "STEP ANGLE B" can cause such a deflection. In the embodiment illustrated in FIG. 9, the surface geometry can be used to turn the signal on, off, and on, as shown.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A docking station for controlling the reflection of incident beams to influence navigation of an autonomous mobile device associated with the docking station and having a navigation sensor comprising an emitter emitting a beam and a detector detecting a reflected emitted beam, the docking station comprising a docking body defining:
    a receiving surface raised above a floor surface supporting the docking station; and
    a ramp extending downwardly from the receiving surface to the floor surface, the ramp defining steps, each step having at least one surface having a geometry configured to direct a reflection from the emitted beam of emitter of the autonomous mobile device in a predetermined direction so that a suitable amount of the reflected beam can be detected by the detector of the autonomous mobile device.

2. The docking station of claim 1, wherein each step comprises a vertical surface and a horizontal surface.

3. The docking station of claim 1, wherein each step comprises a generally horizontal surface and a generally vertical surface, wherein angles of the horizontal and vertical surfaces are oriented at a predetermined angle to attain a desired reflection path of light from the stepped surface.

4. The docking station of claim 1, wherein the surface geometry comprises a bumpy, textured surface.

5. The docking station of claim 1, wherein autonomous mobile device is robotic floor cleaning device.

6. The docking station of claim 5, wherein the navigation sensor is a cliff sensor.

7. The docking station of claim 1, wherein the ramp is inclined with respect to a surface over which the autonomous mobile device is intended to travel.

8. The docking station of claim 7, wherein the ramp is inclined toward the receiving surface at an angle of 30° to 60° with respect to the floor surface.

9. A docking station for controlling the reflection of incident beams to influence navigation of an autonomous mobile device associated with the docking station and having a navigation sensor comprising an emitter emitting a beam and a detector detecting a reflected emitted beam, the docking station comprising:
    a docking body defining:
        a receiving surface raised above a floor surface supporting the docking station; and
        at least one ramp surface extending downwardly from the receiving surface to the floor surface generally in a first plane and having a geometry comprising subsurfaces extending in different planes than the first plane and directing a reflection from the emitted beam from the autonomous mobile device toward the detector of the autonomous mobile device.

10. The docking station of claim 9, wherein the surface geometry comprises at least one step.

11. The docking station of claim 10, wherein each step comprises a vertical surface and a horizontal surface.

12. The docking station of claim 10, wherein each step comprises a generally horizontal surface and a generally vertical surface, wherein angles of the horizontal and vertical surfaces are oriented at a predetermined angle to attain a desired reflection path of light from the stepped surface.

13. The docking station of claim 9, wherein the autonomous mobile device is a robotic floor cleaning device.

14. The docking station of claim 13, wherein the navigation sensor is a cliff sensor.

15. The docking station of claim 9, wherein the at least one ramp surface is inclined with respect to a surface over which the autonomous device had been traveling.

16. The docking station of claim 15, wherein the at least one ramp surface is inclined at an angle of 30° to 60° with respect to the floor surface over which the autonomous device had been traveling.

17. A docking station having at least one inclined, reflective surface configured to control the reflection of incident beams, the surface influencing navigation of a robotic cleaning device having a navigation sensor comprising an emitter emitting a beam and a detector detecting a reflected emitted beam,
    wherein the at least one inclined, reflective surface comprises at least one step has having a geometry configured to direct a reflection from the emitted beam in a predetermined direction so that a suitable amount of the reflected beam can be detected by the detector.

18. The docking station of claim 17, wherein each step comprises a generally horizontal surface and a generally vertical surface, wherein angles of the horizontal and vertical surfaces are oriented at a predetermined angle to attain a desired reflection path of light from the stepped surface.

* * * * *